Figure 2:
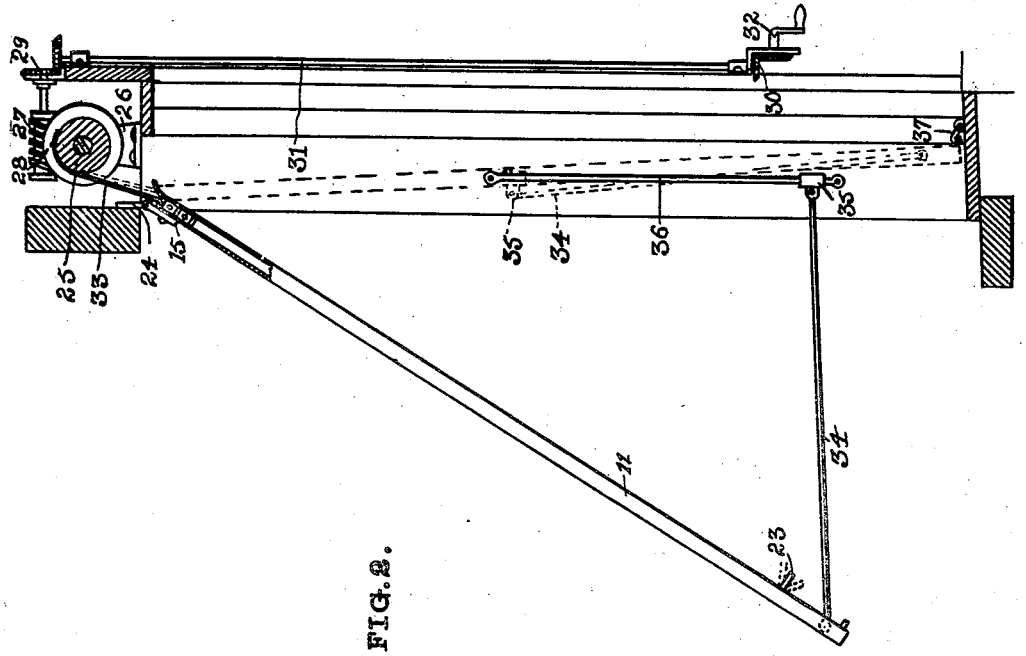

G. C. TROTTER.
SHUTTER.
APPLICATION FILED JULY 26, 1909.

1,005,584.

Patented Oct. 10, 1911.

3 SHEETS—SHEET 1.

WITNESSES:

INVENTOR
George C. Trotter
BY Meyers, Cushman &c.
HIS ATTORNEYS

G. C. TROTTER.
SHUTTER.
APPLICATION FILED JULY 26, 1909.

1,005,584.

Patented Oct. 10, 1911.

3 SHEETS—SHEET 2.

WITNESSES:
Robt. F. Dilworth
E. W. Colford

INVENTOR.
George C. Trotter
BY Meyers, Cushman & Rea
HIS ATTORNEYS

G. C. TROTTER.
SHUTTER.
APPLICATION FILED JULY 26, 1909.
1,005,584.
Patented Oct. 10, 1911.
3 SHEETS—SHEET 3.
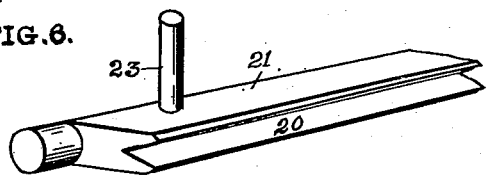
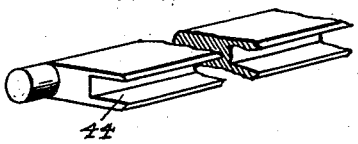
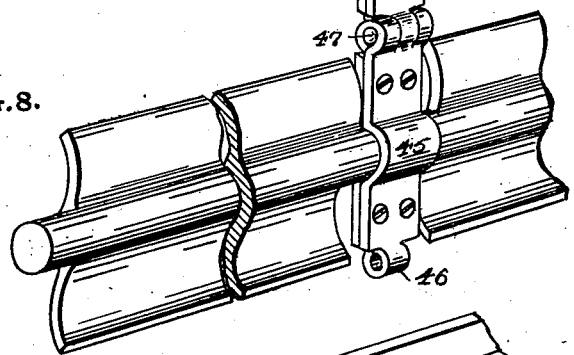
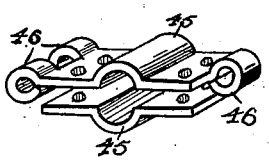
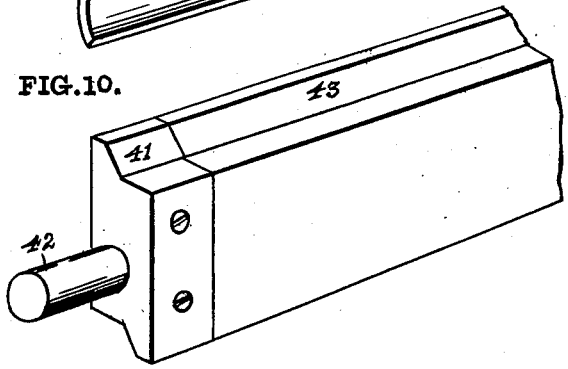
WITNESSES:
INVENTOR
George C. Trotter
BY Meyers, Cushman &c.
HIS ATTORNEYS

UNITED STATES PATENT OFFICE.

GEORGE C. TROTTER, OF MOUNT OLIVER, PENNSYLVANIA, ASSIGNOR OF ONE-HALF TO J. W. KRAUS, OF MOUNT OLIVER BOROUGH, ALLEGHENY COUNTY, PENNSYLVANIA.

SHUTTER.

1,005,584.	Specification of Letters Patent.	Patented Oct. 10, 1911.

Application filed July 26, 1909. Serial No. 509,676.

*To all whom it may concern:*

Be it known that I, GEORGE C. TROTTER, a citizen of the United States, residing at Mount Oliver, in the county of Allegheny and State of Pennsylvania, have invented new and useful Improvements in Shutters, of which the following is a specification.

My invention has for its object the production of a shutter which is adapted to a great variety of different situations, brought about by change in weather conditions at the point where the shutter is used.

As is well known weather conditions often vary very rapidly and also vary widely. It is to produce a shutter which will meet the greatest number of these conditions possible, and meet them in the most convenient and efficient manner that I have suggested my improved shutter.

In order to obtain the objects of my invention I have chosen that general form of shutter which has seemed to me adaptable to my purpose. This form of shutter is what is commonly known as a movable slat or vane shutter, and comprises a plurality of slats or vanes movably supported in a frame. I so form the slats of this shutter, and so form the frame in which they are mounted, that a most convenient operating means for turning the slats may be mounted within the frame itself. By this same construction of the slats and frame, I adapt the shutter to fulfil three different situations. First, the shutter as a whole may be used as an awning by pivoting or hinging the frame at one end to the wall or other fixed support. Second, in its use as a shutter the slats may be raised and lowered thus in effect raising and lowering a shutter, and third, in its use as a shutter the slats may be turned with respect to the frame to open and close the shutter. I may thus hinge my improved shutter to the upper part of the window frame which it is adapted to fit, and may then by turning the shutter on its hinges and moving it out from the window use it as an awning. By returning it to its normal position within the window frame and raising and lowering the slats I may open the window entirely or close it entirely, and by turning the slats themselves I may regulate the amount of light or air, as desired. I accomplish these results by forming the side pieces of the frame of the shutter of channel irons and mounting the slats in said frame with their ends projecting into the channels. I provide within one of the channels, a means engaging the ends of the slats to turn them to open and close the shutter, and provide means for drawing the slats along the channels to raise and lower them, and so hinge or otherwise support the entire shutter from the wall or frame in connection with which it is to be used as to permit it to be extended at an angle to the wall or frame to serve as an awning.

In my invention I make use of a number of detail elements, the construction of which in each case, lends to the efficiency of the combination as a whole.

The entire shutter is intended to be made of metal, preferably a light, non-corrosible metal, and if made of corrosible metal the entire shutter is intended to be rendered rust-proof by galvanizing or some other suitable process.

Figure 1:
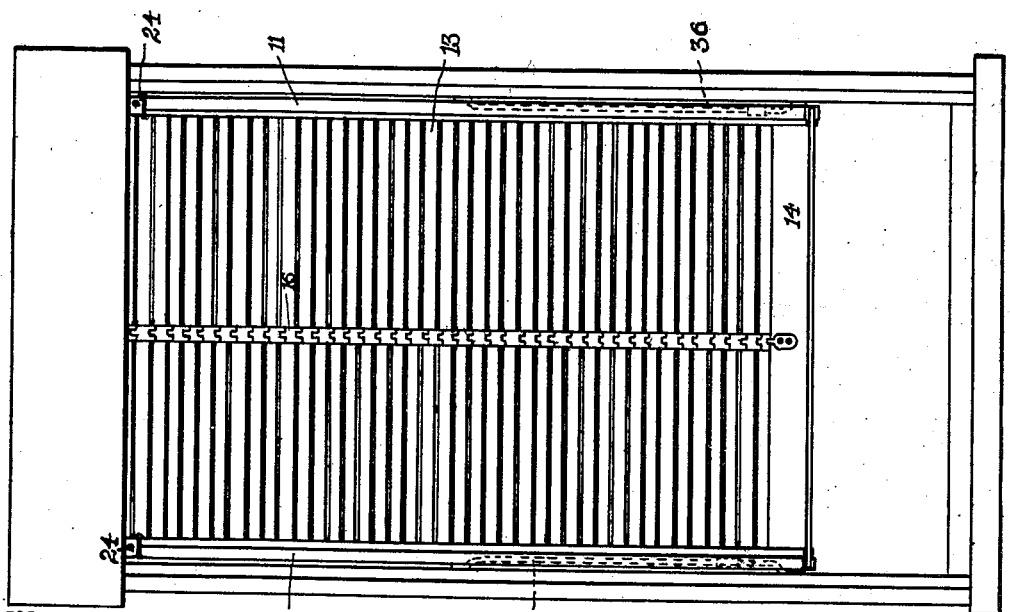
Figure 3:
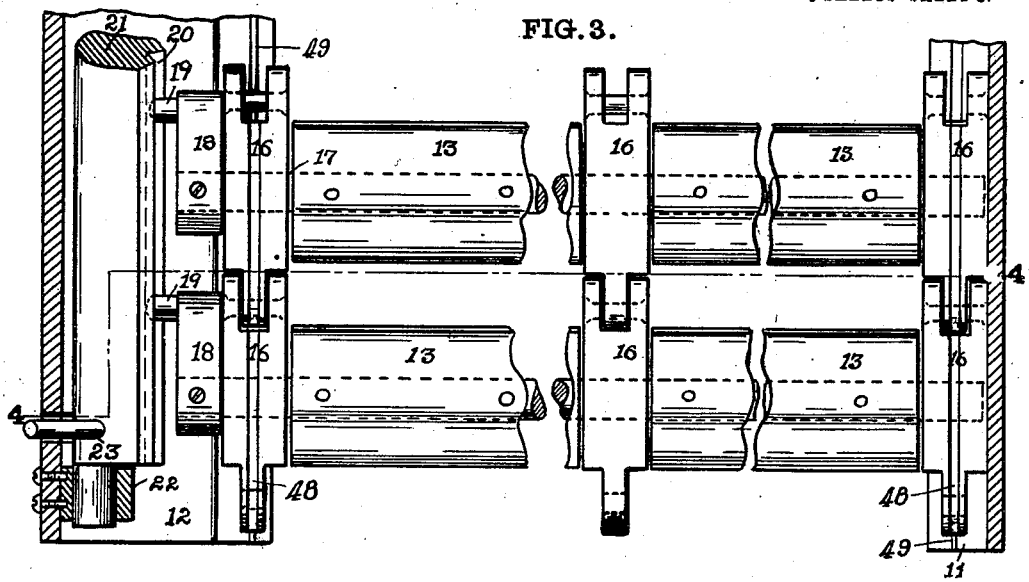
Figure 4:
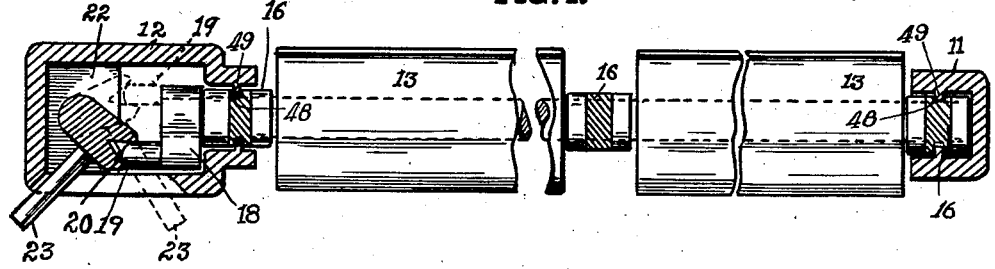
Figure 5:
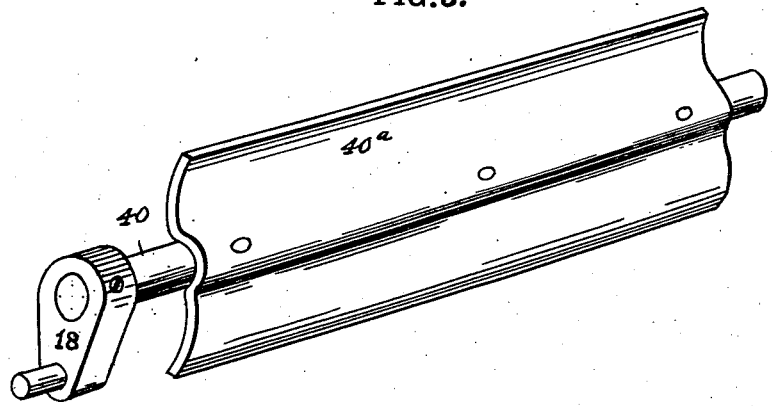

The construction and operation of my invention will be readily understood from the following description taken in connection with the accompanying sheets of drawing, in which, Figure 1 is a front elevation of my improved shutter mounted in a window frame. Fig. 2 is a section side elevation of the same showing it in its extended position, in use as an awning. Fig. 3 is a detail view partly broken away of the slats as mounted in a frame, showing the means connecting them together, and the means for turning them. Fig. 4 is a section of the same taken along the line 4—4 of Fig. 3. Fig. 5 is a perspective view of one of the slats. Fig. 6 is a perspective view of the means for turning the slats. Fig. 7 is a view of a modified form of the means shown in Fig. 6. Fig. 8 is a perspective view of a modified form of slat. Fig. 9 shows a modified form of connecting means for the slats, and Fig. 10 is a perspective view of a third form of slat.

11 and 12 designate the side members of the frame supporting the slats 13 of the shutter, the members 11 and 12 being formed of channel irons or in a U-shape. The member 12 is somewhat larger than the member 11, and the two members are connected together at their ends by end members 14 and 15. The slats are connected together by means of links 16, the links having holes formed in them into which the ends 17 of the vanes project, and the consecutive links are connected by rivets, as shown, or other suitable means to form a chain connecting all the slats in the shutter together.

The ends of the slats on one side of the shutter project beyond the links 16, and into the body of the side member 12. Arms or cranks 18 are secured to these ends and provided with pins 19 which project into a groove 20 formed in the bar 21 which extends longitudinally of the channel member 12 and is pivoted in suitable bearings 22. The groove 20 is preferably on one edge of the bar 21 while the pivotal points of the bar are adjacent the opposite edge. Thus when the bar is turned by means of a lever 23 the pins in the ends of the arms 18 are engaged and turn the slats. The slats are so positioned that when movement is imparted to them by turning bar 21 they are turned through 90° at each oscillation of the bar 21, and present either their edges or their flat sides to the front thus opening and closing the shutter.

As shown, the shutter is hinged at its upper end by means of hinges 24, to the upper part of the window frame. Mounted in the upper part of the window is a roller 25 in the frame 26. On one end of this roller is a worm gear 28 meshing with a worm 27, which is adapted to be turned to operate the roller by means of bevel gears 29 and 30 connected together by a shaft 31 and operated by a crank 32. The topmost of the links 16 are connected to the roller by tapes 33 in such manner that by turning the crank 32 the slats may be drawn up and wound around the roller 25, the links maintaining the position of the slats with respect to each other, and the ends of the slats sliding freely within the channels on the side members 11 and 12 into which they project. In this operation the pins 19 which project into the groove 20 in the bar 21 for turning the slats, slide along this groove to the upper end of the bar and pass freely out of the ends of the side members 11 and 12, owing to the fact that the slats will lie when rolled up in the drum with their flat sides to the drum. The arms 18 are positioned accurately so that when the slats are again lowered the pins 19 find and follow again the groove 20 in the bar. At the lower end of the frame are connected rods 34 which connect at their other ends with sleeves 35 adapted to slide on guide rods 36 secured to the side of the window frame. By moving the sleeves 35 up and down on the guide rods 36 I may readily move my shutter out to the full line position shown in Fig. 2 in which position it serves as an awning, and as readily move it inward to its normal position within the window frame, shown in dotted lines. To hold the shutter in normal position within the window frame I provide a latch 37. It will thus be seen that my improved ventilating shutter adapts itself to the three conditions outlined above.

In Figs. 1 and 3 I have shown a shutter provided with the form of slat shown in Fig. 5. This slat is made of a rod 40 on which is mounted a vane 40ª of aluminum or other light rust-proof material. As shown this vane is substantially S-shaped, and a series of vanes mounted, as shown in Figs. 1 and 3, overlap at their edges when the shutter is closed, the curved surfaces making a comparatively tight closure, and a better closure than would be made were the surfaces entirely flat. The rods 40 and attached arms 18 are to be galvanized, and like the vanes 40ª made of some rust-proof metal or other material, as is the case with the entire frame work of the shutter.

In Figs. 8 to 10 I have shown two other forms of slats. The slat in Fig. 8, is a metallic slat and the vanes are formed integral with the central rod portion. The central portion of the vane is cut away in order to permit the slat to be supported at its middle.

In Fig. 9 is shown a two-part supporting link adapted to be placed around the slat at this middle point. As shown this link comprises two similar parts each provided with a central portion 45 adapted to embrace the slat, and end portions with eyelets 46 through which may be passed rivets or bolts for securing the parts of the link together and successive links to each other. The application of the link shown in Fig. 9 to the vane is clearly shown in Fig. 8, the two halves of the link being secured together about the middle portion of the vane, and connected to adjacent links by pins 47 passing through the eyelets.

The form of slat shown in Fig. 10 is made of wood and provided with metallic end pieces 41 carrying pins 42 adapted to project into the channels of the side members 11 and 12. The edges of the wooden slats are beveled as at 43 in order that they may lap at their edges and keep out rain and wind in a more efficient manner. The wooden slats have the advantage of being very light, although they are by no means as durable as the metallic slats.

Fig. 6 shows in perspective the form of the bar 21 which is used in the construction shown in Figs. 3 and 4. In Fig. 7 is shown a modified form in which there is formed a rectangular groove 44 instead of a V-shaped groove 20, as in the bar 21.

Reference to Figs. 3 and 4 will show that I have provided a tongue and groove connection between the links or connecting means on the ends of the slats and the side members. Grooves 48 are provided in the links which receive slidably tongues 49 on the side members. I find that this keeps the slats in proper relation to each other and to the frame, and is very desirable in all shutters which are intended for use in the hardest of weather conditions. A shutter made with this tongue and groove is practically "wind proof," it being impossible for the wind to blow the slats out of place or to change their adjusted angular position.

My shutter thus constructed fills a wide variety of conditions. The construction is at the same time exceedingly simple and durable, owing to the fact that it is constructed of metal which is not subject to the deterioration that shutters constructed of other materials are subject to. Extremely convenient means are provided for its manipulation. For all these various advantages this shutter is most desirable for use in many situations.

While I have described the best form of my invention now known to me it is, of course, obvious that my invention may be made in other forms without departing from its generic spirit. I desire to cover all such forms in the annexed claims.

What I claim as new is:

1. A shutter comprising a frame, the sides of which are channeled, slats movably supported in said frame, the ends of said slats projecting into said channels, and slidable up and down therein for raising and lowering the shutter, and means in said channels for moving the slats about their axes to open and close the shutter.

2. In a shutter, a frame, channels in the sides of said frame, slats movably supported in said frame, the ends of said slats projecting into said channels, means in the channel for moving about their axes the slats to open and close the shutter, and means for drawing the slats along the channels to raise and lower the shutter.

3. In a shutter, a frame, channels in the sides of said frame, slats movably supported in said frame, and adapted to be moved bodily along said channels the ends of said slats projecting into said channels, arms on the ends of said slats in one of said channels, and means engaging said arms for opening and closing the shutter.

4. A shutter comprising a frame, channels in the sides of said frame, slats in said frame, and adapted to be moved bodily along said channels the ends of said slats projecting into said channels, a member provided with a groove in one of said channels, projections from the ends of said slats extending into said groove, and means for moving said member.

5. A shutter composed of a plurality of slats, and a chain composed of links made in two parts, each link of said chain embracing and supporting a slat between its parts.

6. A shutter composed of a plurality of slats each comprising a rod and two or more attached vanes spaced apart, and means connecting the rods together at each end and between the vanes.

7. A shutter composed of a plurality of slats comprising a rod carrying a plurality of vanes spaced apart, and means connecting the rods together between the vanes.

8. A shutter comprising a plurality of slats, connecting means between the slats, a frame, a frame having slotted sides, projections from the slats extending into the slots and engaging the side walls thereof, and a tongue and groove connection between a side wall of the slot and each projection of the slats.

9. A shutter comprising a plurality of slats, a channeled frame in the channels of which the slats are slidably mounted, and an independent tongue and groove connection between each slat and a wall of said channel.

In testimony whereof I have hereunto set my hand in presence of two subscribing witnesses.

GEORGE C. TROTTER.

Witnesses:
A. K. KAUFMAN,
J. W. KRAUS.